United States Patent
Wang et al.

(10) Patent No.: US 7,866,997 B2
(45) Date of Patent: Jan. 11, 2011

(54) ELECTRICAL CARD CONNECTOR

(75) Inventors: Zhi-Feng Wang, Kunshan (CN); Wei Kang, Kunshan (CN)

(73) Assignee: Hon Hai Precision Ind. Co., Ltd, Taipei Hsien (TW)

( * ) Notice: Subject to any disclaimer, the term of this patent is extended or adjusted under 35 U.S.C. 154(b) by 0 days.

(21) Appl. No.: 12/569,901

(22) Filed: Sep. 30, 2009

(65) Prior Publication Data

US 2010/0081305 A1    Apr. 1, 2010

(30) Foreign Application Priority Data

Sep. 30, 2008    (CN) .................... 2008 1 0155421

(51) Int. Cl.
*H01R 13/62* (2006.01)
(52) U.S. Cl. .................................... 439/159
(58) Field of Classification Search ............. 439/159, 439/160, 630; 361/823
See application file for complete search history.

(56) References Cited

U.S. PATENT DOCUMENTS

| 6,310,779 | B1 * | 10/2001 | Wang ..................... 361/760 |
| 6,773,280 | B2 * | 8/2004 | Sasaki et al. ............ 439/159 |
| 2007/0093099 | A1 * | 4/2007 | Kuo ....................... 439/159 |
| 2007/0155210 | A1 * | 7/2007 | Matsukama et al. ...... 439/159 |
| 2007/0249201 | A1 * | 10/2007 | Cheng et al. ............ 439/159 |
| 2008/0123320 | A1 | 5/2008 | Cheng |

* cited by examiner

*Primary Examiner*—Renee Luebke
*Assistant Examiner*—Larisa Tsukerman
(74) *Attorney, Agent, or Firm*—Andrew C. Cheng; Wei Te Chung; Ming Chieh Chang

(57) ABSTRACT

An electrical card connector comprises an insulative housing (10), a plurality of contacts (20) received in the housing, a shell (30) covering the housing and an ejector (500. The housing is located at the front of the shell. The ejector comprises a base (51) and an ejecting member (53) assembled on the base, the base is located at the side of the housing, and the ejecting member is moveably in a card inserting direction. The base is secured to the housing to limit a lateral movement of the base.

10 Claims, 4 Drawing Sheets

ELECTRICAL CARD CONNECTOR

BACKGROUND OF THE INVENTION

1. Field of the Invention

The present invention relates to an electrical card connector, and particularly to an electrical card connector with an ejector.

2. Description of Prior Art

With the development of electronic appliances, an express card connector has been widely used to achieve data transmission between an express card and a corresponding electronic appliance. In order to draw the express card out of the card connector conveniently, the express card connector will have an ejector to eject the express card.

An electrical card connector with an ejector is described in U.S. Patent Publication No. 2008/0123320, which was published on May 29, 2008. The card connector comprises an insulative housing, a plurality of contacts received in the housing, a shell covering the housing and ejector assembled on the housing. The ejector is located at one side of the housing and received in a space defined by the shell. The ejector includes a base portion, a spring, a pin member and an ejecting member. The base portion is separated with the housing, and the pin member and the ejecting member are assembled on the base portion. The spring is assembled on the pin member and the shell. When an electrical card is inserted into the connector, the ejecting member bears a force forwardly, and the spring bears a force backwardly. The base portion may be moveable corresponding to the housing by the two adverse forces, and the ejector will be disabled.

Hence, it is desirable to have an improved electrical card connector to overcome the above-mentioned disadvantages of the prior art.

BRIEF SUMMARY OF THE INVENTION

Accordingly, the object of the present invention is to provide an electrical card connector with an ejector assembled on the housing firmly.

In order to achieve the above-mentioned object, an electrical card connector comprises: a metallic shell; an insulative housing located at the front of the shell, the housing cooperating with the shell to form a card receiving space; a plurality of contacts received in the housing; and an ejector assembled on the housing and comprising a base with a heart-shaped slot, a spring, a pin member and an ejecting member assembled on the base. The base is located at a side of the housing, and the ejecting member is moveable in a card inserting direction. The base is secured to the housing to limit a lateral movement of the base.

Other objects, advantages and novel features of the invention will become more apparent from the following detailed description of the present embodiment when taken in conjunction with the accompanying drawings.

DETAILED DESCRIPTION OF THE INVENTION

Figure 1:
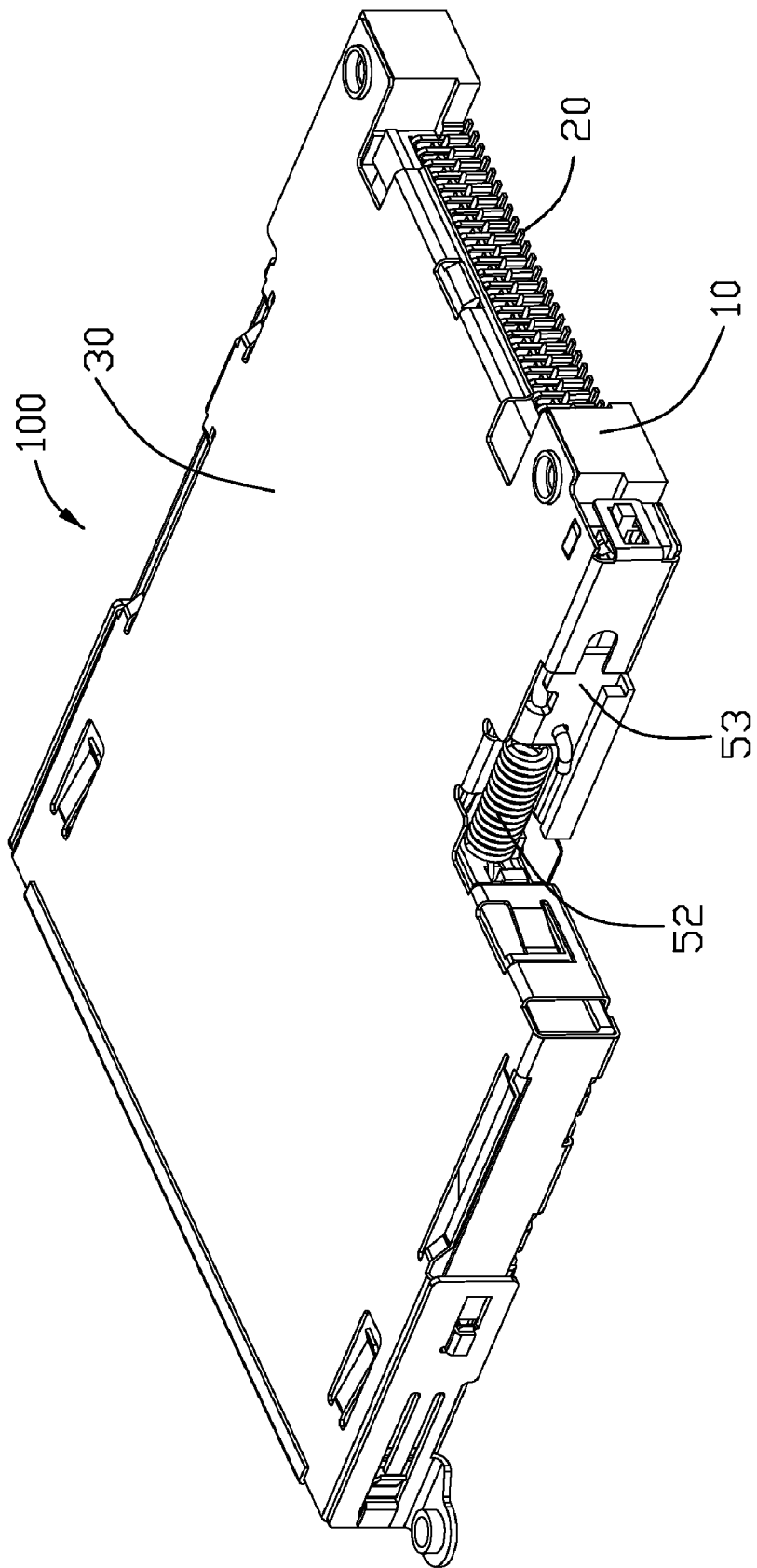
FIG. 1 is a perspective view of an electrical card connector in accordance with the present invention.

Reference will now be made to the drawing figures to describe the present invention in detail.

Referring to FIG. 1 to FIG. 4, an electrical card connector 100 of the present invention comprises an insulative housing 10, a plurality of contacts 20 held on the housing 10, a shell 30 covering the housing 10, a guiding member 40 and an ejector 50.

The insulative housing 10 is located at the front of the shell 30, and comprises a main portion 11, a pair of guiding arms 12 and a pair of assembling portions 15 extending rearward and forwardly from opposite sides of the base portion 11 respectively. A mating portion 13 extends rearward from the main portion 11 and is disposed between the two guiding arms 12. The contacts 20 are received in the mating portion 13 and extend beyond the insulating housing 10 to be soldered on a circuit board (not shown). One of the guiding arms 12 further defines a receiving groove 14 extending vertically, and a pair of stoppers 16 are located at the front and the rear of the receiving groove 14, an opening (not labeled) is defined between the stoppers 16.

Figure 2:
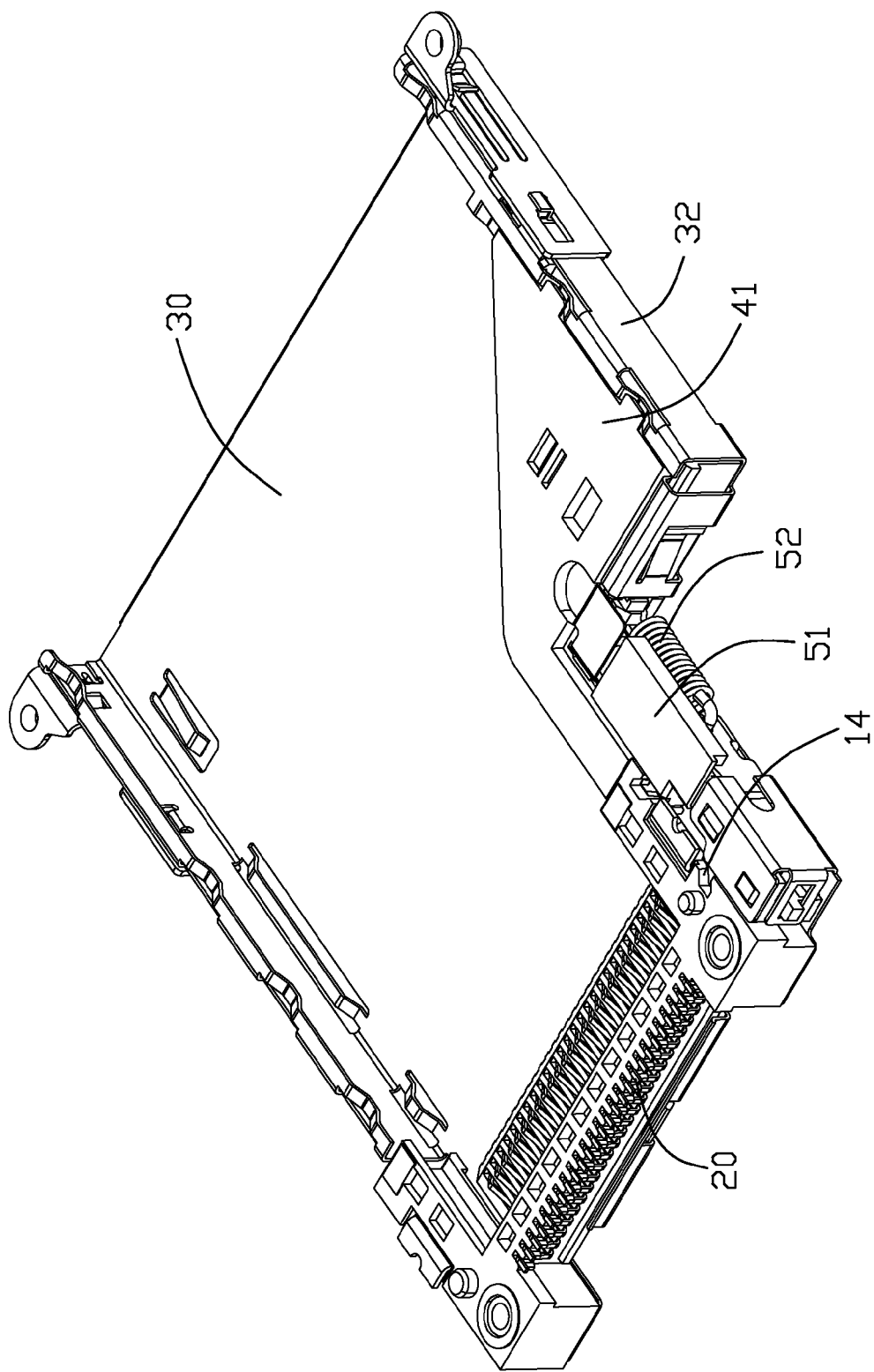
FIG. 2 is a view similar to the FIG. 1, but taken from other aspect.
Figure 3:
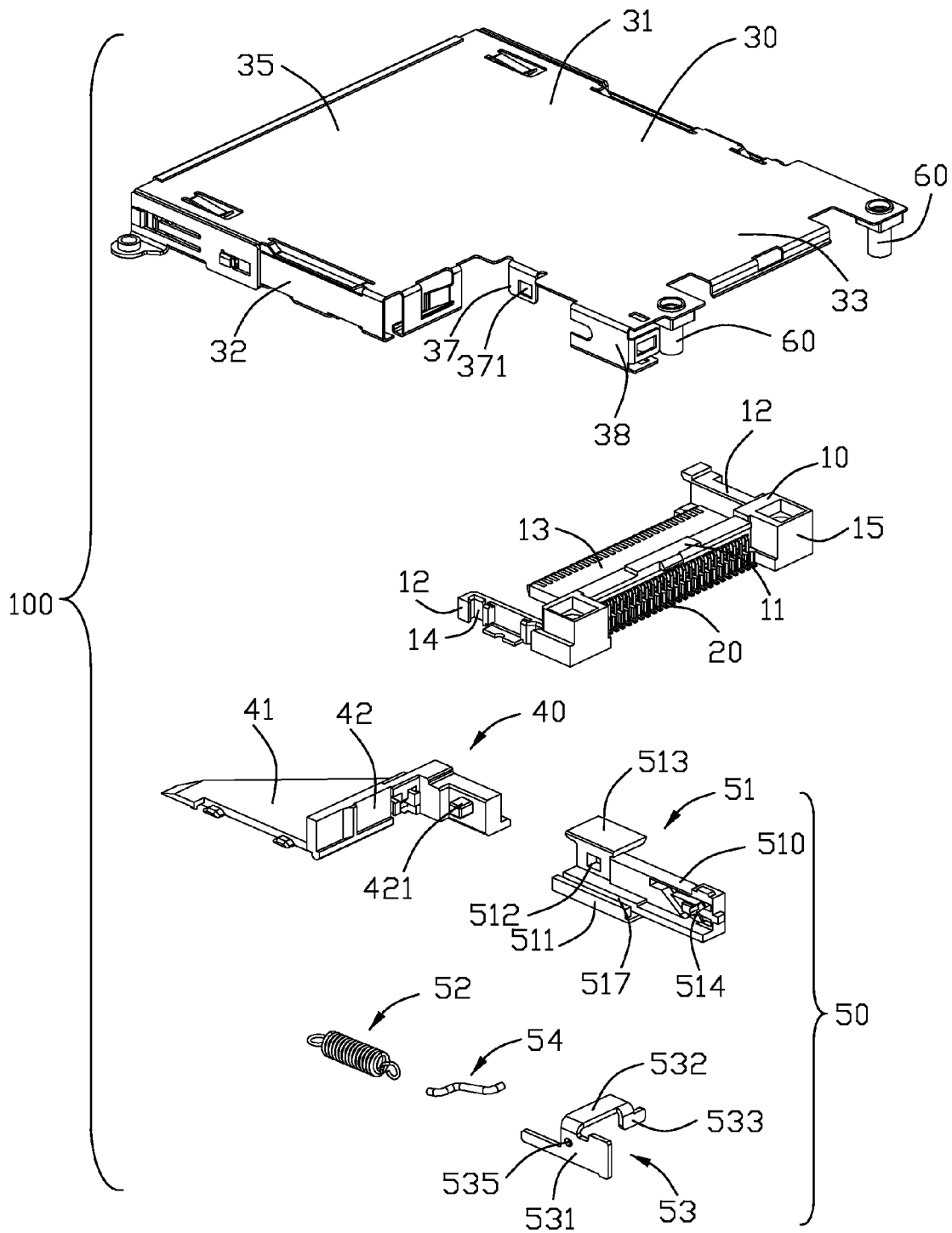
FIG. 3 is an exploded, perspective view of the electrical card connector shown in FIG. 1.
Figure 4:
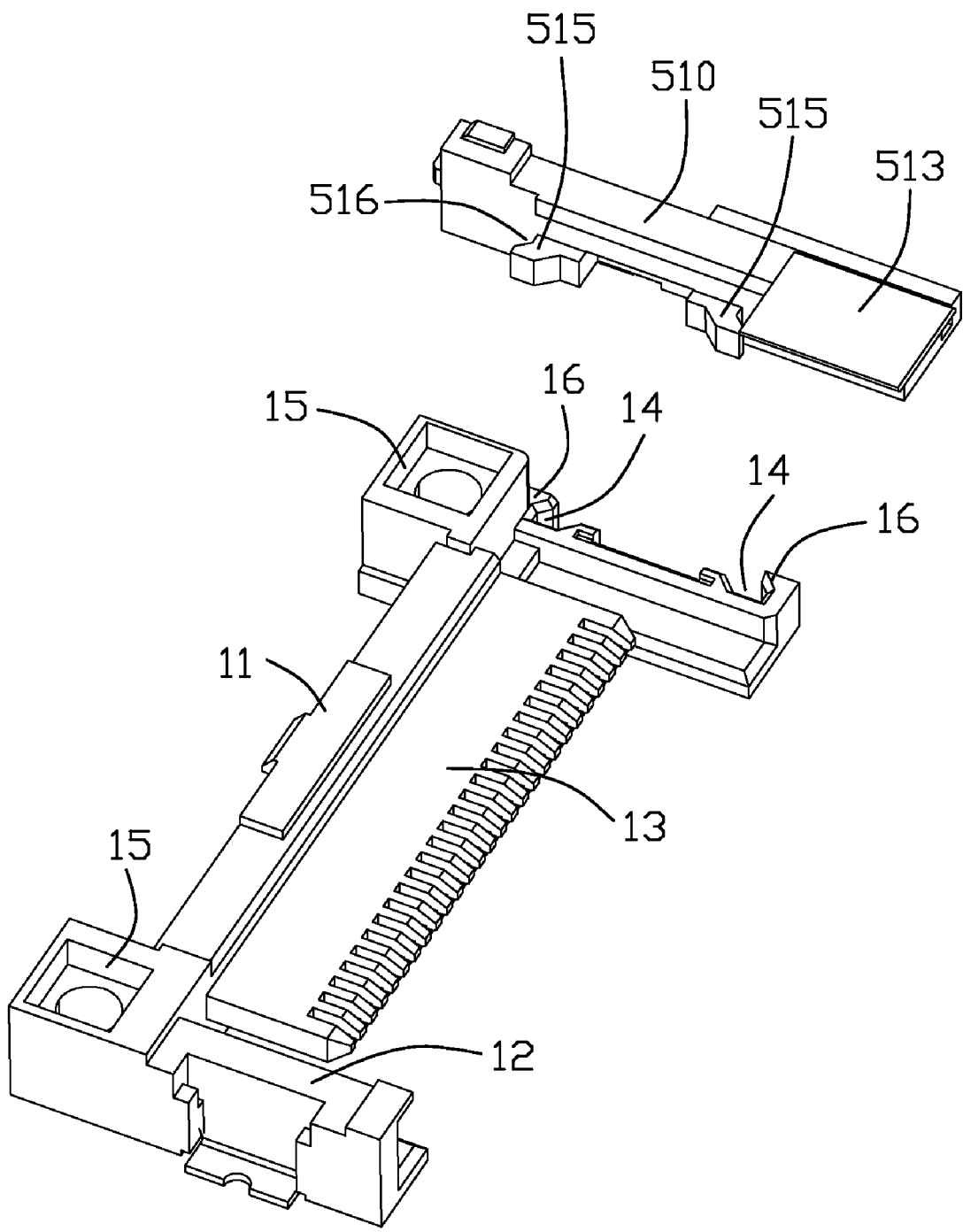
FIG. 4 is a perspective view of an insulative housing and a base of the electrical card connector.

Referring to FIG. 1 to FIG. 3, the shell 30 is assembled on the housing 10 to define a card receiving space (not labeled). The shell 30 is L-shaped, and comprises a main body 31 and sidewalls 32 extending downwardly from the main body 31. The main body 31 comprises a front section 33 and a rear section 35 extending rearward from the front section 33. The width of the rear section 35 is wider than that of the front section 33 along a transverse direction perpendicular to a card insertion/ejection direction. A holding piece 37 and a receiving portion 38 extend downwardly from a lateral side of the front section 33. The holding piece 37 with a receiving hole 371 thereon is located behind the receiving portion 38. The receiving portion 38 is used for receiving the ejector 60. A pair of screws 16 are assembled on the front of the front section 33 and are held in the assembling portions 15 of the housing 10 to assemble the shell 30 on the insulating housing 10 together.

The guide element 40 is approximately a triangle shape and assembled to sidewall 32 of the shell 30. The guide element 40 has a board 41 and an L-shaped perpendicular wall 42 extending forwardly and upwardly from a front end of the board 41. The perpendicular wall 42 is formed with a protrusion 421 at an outside thereof to be received in the receiving hole 371 of the holding piece 37.

Referring to FIG. 1 to FIG. 4, the ejector 50 is located at one side of the housing 10, and comprises a base 51, a resilient member 52, an ejecting member 53 and a pin member 54. In this embodiment, the resilient member 52 is a spring. The base 51 comprises a vertical portion 510 with a heart-shaped slot 514 therein and horizontal portions 513, 511 extending outwardly from the vertical portion 510 respectively. The horizontal portion 511 defines a guiding slot 517 along the card insertion/ejection direction. A holding portion 515 is formed on the vertical portion 510 toward the guiding arm 12, which is received in the vertical receiving groove 14 of the insulative housing 1. The holding portion 515 further defines a pair of gaps 516 located at the front and rear portion thereof. The holding portion 515 engages with the receiving groove 14 to secure the base 51 to the insulative housing 10. The stopper 16 is received in the gap 516 to prevent the base 51 moving in the horizontal direction. The rear end of the vertical portion 510 defines a rectangular hole 512. The protrusion 421 of the guide element 40 is received in the receiving hole 371 of the holding piece 37 after the protrusion 421 passes through the rectangular hole 512.

The ejecting member 53 is moveably assembled on the base 51. The ejecting member 53 comprises a sliding portion 531 sliding along the guiding slot 517, an intermediate portion 532 extending horizontally from an upper portion of the sliding portion 531 and an ejecting portion 533 extending downwardly from a free end of the intermediate portion 532 and exposed into the card receiving space to eject a card directly. The sliding portion 531 and the ejecting portion 533 are located at the opposite sides of the base 51.

One end of the pin member 54 locks in a hole 535 defined in the ejecting member 53 and the other end thereof is moveably received in the heart-shaped slot 514 of the base 51. One end of the spring 52 is assembled on the guiding member 40 and the other end thereof locks the pin member 54.

When an electrical card (not shown) is inserted into the card receiving space, the ejecting portion 533 of the ejecting member 53 bears a force toward forwardly, and the sliding portion 531 of the ejecting member 53 bears another force toward backwardly. The two reverse forces will derive the base 51 rotatablely. The holding portion 515 cooperates with the receiving groove 14 and the stopper 16 is received in the gap 516 to limit movement of the base 51 in a horizontal direction, and accordingly, the base 51 is secured on the housing 10. Therefore, the ejector 50 can be assembled on the housing 10 firmly.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical card connector comprising:
a metallic shell;
an insulative housing located at the front of the shell, the housing cooperating with the shell to form a card receiving space;
a plurality of contacts received in the housing; and
an ejector assembled on the housing and comprising a base with a heart-shaped slot, a spring, a pin member and an ejecting member, the base being located at a side of the housing, the ejecting member being moveable relative to the base in a card inserting direction;
wherein the base is secured to the housing to limit a lateral movement of the base a receiving groove is defined in the housing and a holding portion is formed on the base, and the holding portion is retained in the receiving groove, wherein a pair of stoppers are located at the front and the rear of the receiving groove, and the holding portion defines a pair of gaps for receiving the stoppers.

2. The electrical card connector as claimed in claim 1, wherein the receiving groove extends in a vertical direction, and the holding portion is assembled to the receiving groove in the vertical direction.

3. The electrical card connector as claimed in claim 1, wherein an opening is defined between the pair of stoppers.

4. The electrical card connector as claimed in claim 3, wherein the insulative housing comprises a main portion and a pair of guiding arms extending from opposite sides of the main portion, and wherein the receiving groove is disposed on one of the guiding arms.

5. The electrical card connector as claimed in claim 4, wherein the ejecting member comprises a sliding portion, an intermediate portion extending horizontally from the sliding portion, and an ejecting portion extending downwardly from a free end of the intermediate portion, and the sliding portion and the ejecting portion are located at opposite sides of the base.

6. The electrical card connector as claimed in claim 5, further comprising a guide element separated from the housing, and wherein the guide element comprises a protrusion at an outside thereof, and the base defines a rectangular hole mating with the protrusion.

7. The electrical card connector as claimed in claim 6, wherein the shell comprises a front section, a rear section extending rearward from the front section and wider than the front section, and a receiving portion extending downwardly from a lateral side of the front section for receiving the ejector.

8. An electrical card connector comprising:
an insulative housing;
a metallic shell covering the housing and cooperating with the housing to commonly define a card receiving space;
a plurality of contacts disposed in the housing with contacting sections extending into the card receiving space; and
an ejector including an insulative stationary base with a heart-shaped slot therein, an ejecting member back and forth moveable relative to the base along a front-to-back direction, a pin member linked between the ejecting member and the heat-shaped slot to decide inner and outer positions of the ejecting member relative to the base, and a spring constantly urging the ejecting member forwardly; wherein
said base is fastened to at least the housing; wherein said base is fastened to the housing along a vertical direction which is perpendicular to said front-to-back direction to restrict movement of said base relative to the housing in both the front-to-back direction and a lateral direction perpendicular to both said front-to-back direction and said vertical direction.

9. The electrical card connector as claimed in claim 8, wherein securement between the base and the housing is performed by means of tenon vs. mortise mechanism.

10. The electrical card connector as claimed in claim 8, further including an insulative guide element providing a board with an oblique guiding edge in the card receiving space, wherein said guide element is locked with the base.

* * * * *